United States Patent Office 3,506,912
Patented Apr. 14, 1970

3,506,912
LARGE GENERATOR SHAFT VOLTAGE REDUCING ARRANGEMENT AND INDICATOR
Robert Braun, Socking, Germany, assignor to Allianz Versicherungs-Aktiengesellschaft, Munich, Germany
Filed June 10, 1968, Ser. No. 735,881
Claims priority, application Germany, June 16, 1967, A 55,995
Int. Cl. G01r *33/00;* H02k *1/00, 11/00*
U.S. Cl. 324—34
4 Claims

ABSTRACT OF THE DISCLOSURE

In a rotating machine comprising a rotor and a stator of ferritic steel is provided means for reducing unipolar voltages comprising at least one arrangement formed by a plurality of axially-stacked annular plates which encircle the rotor shaft, said plates being mechanically and magnetically connected to the stator, and being spaced only a short distance from the rotor.

BACKGROUND OF THE INVENTION

The invention relation to an apparatus for avoiding or at least reducing unipolar voltages in rotating machines where parts of the machine are made of ferritic steel. It is known that axial magnetic flux may arise in rotating machines, such as steam turbines, electric generators and the like; the magnetic flux generally forms chiefly in the rotor and closes through the stator. The magnetic flux results in unipolar voltages between adjacent parts of the rotor and stator, particularly at the shaft bearings, the voltages being perpendicular both to the lines of magnetic force and to the tangential component of the rotary movement of the rotor. These voltages may cause such large electric currents to flow that they cause damage to the machine by Joule heating for example at the shaft bearings or in two halves of a coupling or sets of teeth.

Such unipolar voltages in the rotor or stator of a machine increase with the magnetic induction, the diameter of the rotor at the point of transistion of the magnetic flux between the rotor and stator, and the rotational speed of the shaft of the machine. Owing to the relatively small dimensions and low speed of the machines normally used in the past these phenomena were virtually insignificant. But as machines grow larger the possible unipolar voltages increase at least by the power of two. Currents produced by unipolar voltages resulting from axial magnetic flux and of a strength liable to damage the machine have therefore been detected virtually only in the most modern high-output machines. This is firstly because relatively large unipolar voltages occur, because in consequence of the increasing shaft diameters large fluxes are possible and higher peripheral speeds are reached by the shafts for a given rotational speed, and secondly because owing to the larger dimensions of the machine there are lower resistances in the closing circuit of the unipolar currents, whereas in smaller machines the electric closing circuit does not have a low enough resistance to enable such large currents to flow. For this same reason large rotating machines are particularly susceptible to axial magnetic flux and unipolar currents resulting therefrom. With unipolar voltages resulting from the inevitable magnetic flux, of the order of about 0.1 to 3 volts, with good bearings and steady movement without any rubbing, these currents do not penetrate the films of lubricating oil in the bearings, but where the bearings are defective, the movement uneven or where the rotor rubs within the stator they make take on values of the order of 500 to 10,000 amperes and cause considerable damage, for example by seizing up the bearings or fracturing the shaft by torsion.

In electrical converters with claw-type pole armatures it is already known to suppress magnetisation phenomena by means of austenitic intermediate pieces in the shafting. In the case of turbines, electronically controlled anti-magnetisation coils have already been proposed for the same purpose. But these known protective means are fairly expensive and, where used, can protect turbines only in cases where the magnetic flux is produced by an electric generator.

SUMMARY OF THE INVENTION

In rotating machines having parts made of ferritic steel, the invention aims to avoid unipolar voltages in the rotor of the machine and to keep it as small as possible in the stator. For this purpose it is necessary to transfer the possible magnetic fluxes from the rotor to the stator so that they are let through unhindered. If the magnetic flux is stable relative to the rotor and moves round at the rotational frequency in the stator it is known that no voltages will appear in the rotor, whereas unipolar currents will appear in the solid portions of the stator. If on the other hand the magnetic flux in the stator is stable, which will generally be the case, for example where discharge is through a pedestal bearing, then voltages appear only in the rotor and, given the extremely long shafts of large machines (lengths of from 10 to 35 meters) these can be balanced somewhere. So one must endeavor to keep the rotor free from unipolar voltages.

According to the present invention there is provided in a rotating machine which includes a rotor and a stator parts at least of which are made of ferritic steel, apparatus for reducing unipolar voltages comprising at least one arrangement formed by a plurality of axially-stacked annular plates which encircle the rotor shaft, said plates being mechanically and magnetically connected to the stator, and having only a small air gap relative to the rotor.

BRIEF DESCRIPTION OF THE DRAWING

A rotating machine including an arrangement in accordance with the present invention will now be described by way of example with reference to the accompany drawing, FIG. 1 of which shows a diagrammatic section of the machine, and FIG. 2 of which is a section line taken on line 2—2 of FIG. 1.

DESCRIPTION OF THE PREFERRED EMBODIMENT

Figures 1, 2:
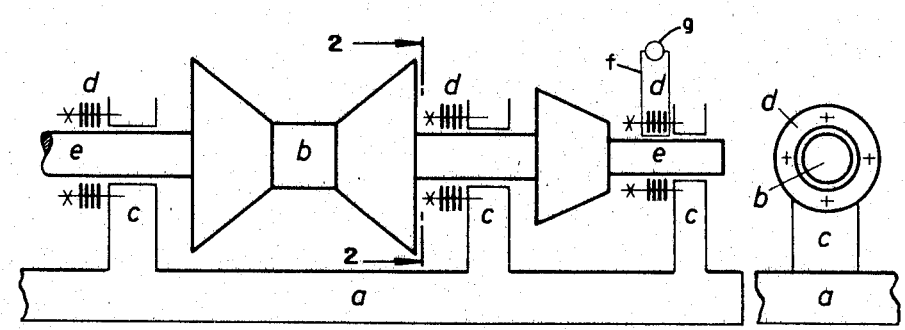

The rotating machine comprises a stator including a baseplate *a* of magnetic material and a rotor *b* also of magnetic material which includes a shaft *e* running in bearings *c*. Disposed adjacent to and secured to each bearing *c* in an arrangement *d* formed by a plurality of axially-stacked annular plates, similar to armature stampings, which encircle the shafe *e* and are spaced by only a small distance therefrom.

By means of the arrangement *d*, which can be termed magnetic flux switches, any magnetic flux may be made spatially stationary in the rotor and need only rotate in the stationary axially-stacked plates, so avoiding any appreciable formation of unipolar and eddy currents. In the plates the rotating magnetic field is converted into a stationary field in the ferritic constructional materials. The unipolar voltages are kept extremely low, as the surface of the shaft *e* does not need to intersect any lines of force emerging from it; this is because the lines of force in the plates in the vicinity of the shaft *e* revolve with the latter, become stationary at the back of the sets of plates and then pass over without relative displacement into the stator without generating any voltage.

The magnetic flux switches here proposed are a cheap means, independent of any external sources of current, for avoiding damage to rapidly moving electrical and non-electrical machines. The switches make it unnecessary to provide non-magnetic shaft inserts, which are in any case prohibitively expensive for large machines, because of the price of their material and the need to lengthen the machine and its housing. The apparatus provided by the invention is universally applicable to turbines and generators and is particularly appropriate for fast moving machines over about 50,000 horsepower.

The arrangements $d$ are preferably connected to shaft bearings or to the housing of the machine, and may carry measuring coils $f$ connected to an instrument $g$ indicating and/or recording the magnetic flux passing through the shaft $e$ at the time. Here again the air gaps between the shaft $e$ and the plates of the arrangements $d$ should be as small as possible. The axial depth of yoke of the unslotted set of plates making up the arrangements $d$ may, for example, be about 2 centimeters, so that the arrangements $d$ can easily be accommodated in the machine. The measuring coil $f$ surrounds the entire cross-section of the arrangement $d$. When a magnetic flux is present a voltage appears in the coil $f$; this can easily be detected with measuring instruments $g$ and provides information about the degree to which the shaft $e$ is being magnetised.

I claim:

1. In a rotating machine which comprises a rotor, including a rotor shaft, and a stator, at least parts of which are made of ferritic steel, apparatus for reducing unipolar voltages comprising at least one arrangement formed by a plurality of axially-stacked annular plates which encircle the rotor shaft, said plates being mechanically and magnetically connected to the stator, and having only a small air gap relative to the rotor shaft.

2. Apparatus according to claim 1 wherein said stator includes bearings in which said rotor shaft runs, and wherein each such arrangement is disposed adjacent to and is secured to an aforesaid shaft bearings.

3. Apparatus according to claim 2 wherein one such arrangement includes a measuring coil and an instrument connected to said coil which indicates the magnetic flux in said shaft.

4. Apparatus according to claim 3 wherein said instrument also records said magnetic flux.

References Cited

UNITED STATES PATENTS

| | | | |
|---|---|---|---|
| 1,100,294 | 6/1914 | Frick | 310—68 |
| 1,816,795 | 7/1931 | Pohl | 310—256 |
| 3,114,063 | 12/1963 | Karsten | 310—256 |

WARREN F. RAY, Primary Examiner

U.S. Cl. X.R.

310—68, 85, 90, 273; 317—13